US005321624A

United States Patent [19]

Helffrich et al.

[11] Patent Number: 5,321,624

[45] Date of Patent: Jun. 14, 1994

[54] INSERTION MACHINE HAVING MULTIPLE DOCUMENT DETECTOR

[75] Inventors: David J. Helffrich, Charlotte, N.C.; Randy Trach, Nazareth, Pa.

[73] Assignee: Bell & Howell Phillipsburg Company, Allentown, Pa.

[21] Appl. No.: 956,850

[22] Filed: Oct. 6, 1992

[51] Int. Cl.[5] .................... G06F 15/20

[52] U.S. Cl. .................... 364/478; 53/504; 53/284.3; 270/58; 271/263

[58] Field of Search .................... 364/478, 563, 471; 270/58, 54; 53/52, 503, 504, 284.3; 271/259, 260, 262, 263

[56] References Cited

U.S. PATENT DOCUMENTS

| | | | |
|---|---|---|---|
| 4,121,818 | 10/1978 | Riley et al. | 364/478 |
| 4,194,685 | 2/1985 | Hill et al. | 270/58 |
| 4,223,882 | 9/1980 | Stocker | 493/11 |
| 4,471,954 | 9/1984 | Bourg | 271/263 |
| 4,527,791 | 7/1985 | Piotroski | 364/478 |
| 4,697,246 | 9/1987 | Zemke et al. | 364/563 |
| 4,761,002 | 8/1988 | Reed et al. | 271/263 |
| 4,894,783 | 1/1990 | Milne | 271/263 X |
| 4,955,185 | 9/1990 | Haas et al. | 53/460 |
| 4,966,354 | 10/1990 | Grunder | 270/58 |
| 4,972,655 | 11/1990 | Ogawa | 364/478 |
| 5,125,635 | 6/1992 | Iwabuchi | 271/263 |
| 5,142,482 | 8/1992 | Sansone | 364/478 |
| 5,144,562 | 9/1992 | Stikkelorum et al. | 364/478 |
| 5,174,562 | 12/1992 | Mizunaga et al. | 271/263 X |

*Primary Examiner*—Joseph Ruggiero
*Attorney, Agent, or Firm*—Millen, White, Zelano & Branigan

[57] ABSTRACT

A multiple-document detection system for an insertion machine comprises a plurality of document detectors, each detector being preset to a successive maximum allowable document-group-thickness measurement; a group of documents whose measured thickness exceeds the preset maximum allowable size for a particular detector will cause that detector's input line to change from a "normal" level to a "tripped" level. A processing means then determines the actual number of documents in a measured group of documents according to which of the successively preset detectors was the first to be "tripped". The processing means also receives a signal indicative of an expected number of documents for the particular measured group. The expected-number signal is sent, for example, by a reader, upstream of the plurality of detectors, which reads the expected number from a master document in the group. The processing means sends an error signal to a machine control means if the measured number exceeds the expected number; the machine control means executes certain error-correction steps upon receiving an error signal from the processing means. The machine control means may, for example, be a second processing means for alerting a machine operator or a remediation device for actuating a diversion of the measured group of documents, or a combination thereof.

15 Claims, 4 Drawing Sheets

INSERTION MACHINE HAVING MULTIPLE DOCUMENT DETECTOR

BACKGROUND OF THE INVENTION

1. Field of the Invention

The invention relates to a mail-handling machine which processes a series of documents in order to produce a series of groups of documents, and particularly to an apparatus for determining whether a group of documents fed onto a processing track in pile form contains the correct number of documents.

2. Related Art

Mail-handling machines are well-known for automating accumulation of a group of inserts along an insertion track and insertion of the accumulated group of inserts into a series of envelopes. Such machines are taught, for example, in U.S. Pat. No. 4,955,185 to Haas, U.S. Pat. No. 4,697,246 to Zemke, and U.S. Pat. No. 4,223,882 to Stocker, which are incorporated herein by reference. In mail-handling machines of this type, it is known to provide a detector for sensing whether a document or group of documents which is fed onto an insertion track for insertion in an envelope contains more documents than expected (a "double document" situation) or less documents than expected (a "missed document" situation). Such situations might arise, for example, when there has been a misfeed at a feeder station along the group's insertion track, resulting in too few or too many documents being fed to a particular group. A detector for sensing such situations is commonly known as a "double/miss detector", and such detectors are generally positioned proximal to a feeder along the insertion track so as to perform measurements upon a document during its ejection from the feeder but before it is added to its respective group of documents along the insertion track. When a "double document" or "missed document" situation is detected, an error signal is sent to a machine control device which then performs a remedial operation, such as ejection of the error-causing document or documents or alerting of a machine operator so that the situation can be remedied manually.

In the device according to Zemke a Hall Effect type double/miss detector is employed to sense a double or miss situation in a document as the document is engaged by a feeder for feeding onto an insert track. The feeder comprises a gripper arm for grasping a single document and pulling it from the bottom of a stack of documents. The gripper arm further comprises a set of jaws between which the document-to-be-fed is grasped. A field-generating means is mounted on one jaw, while a Hall Effect sensor is mounted on the other jaw for sensing the flux density of the generated field, the flux density being a function of the relative displacement of the two jaws.

U.S. Pat. No. 4,471,954 to Bourg, which is incorporated herein by reference, teaches a document-handling machine employing a second type of double/miss detector. The machine according to Bourg utilizes an infrared type double/miss detector mounted in a passage through which a sheet being ejected from a feeder passes. An infrared light source is mounted on one wall of the passage, while an infrared detector is mounted on an opposite wall. As a sheet is ejected from the feeder, the measurement signal from the infrared detector is compared with a reference signal, and if the measurement signal differs from the reference signal beyond a predetermined deviation, an alarm signal indicating a double or miss situation is generated.

The document-handling machines of the prior art provide double/miss detection at a sheet-feeder output, and that detection is limited to sensing of whether a feeder is ejecting a single sheet, more than a single sheet, or no sheets at all. While the machines of the prior art perform their intended purpose admirably, they cannot detect a double/miss situation in a group of multiple documents wherein the expected number of documents in a particular group being detected may vary from that of other groups in a series of groups.

SUMMARY OF THE INVENTION

The present invention overcomes the limitations of the prior art by providing a multiple detector system which allows input of an expected number of documents for a particular group of documents to be measured, measures the actual number of documents in the group, and executes certain error-correction steps if the expected number exceeds the measured number. The machine comprises a plurality of document detectors, each detector being preset to a successive maximum allowable document-group-thickness measurement; a group of documents whose measured thickness exceeds the preset maximum allowable size for a particular detector will cause that detector's input line to change from a "normal" level to a "tripped" level. A processing means then determines the actual number of documents in a measured group of documents according to which of the successively preset detectors was the first to be "tripped". The processing means also receives a signal indicative of an expected number of documents for the particular measured group. The expected-number signal is sent, for example, by a reader, upstream of the plurality of detectors, which reads the expected number from a master document in the group. The processing means sends an error signal to a machine control means if the measured number exceeds the expected number; the machine control means executes certain error-correction steps upon receiving an error signal from the processing means. The machine control means may, for example, be a second processing means for alerting a machine operator or a remediation device for actuating a diversion of the measured group of documents, or a combination thereof.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
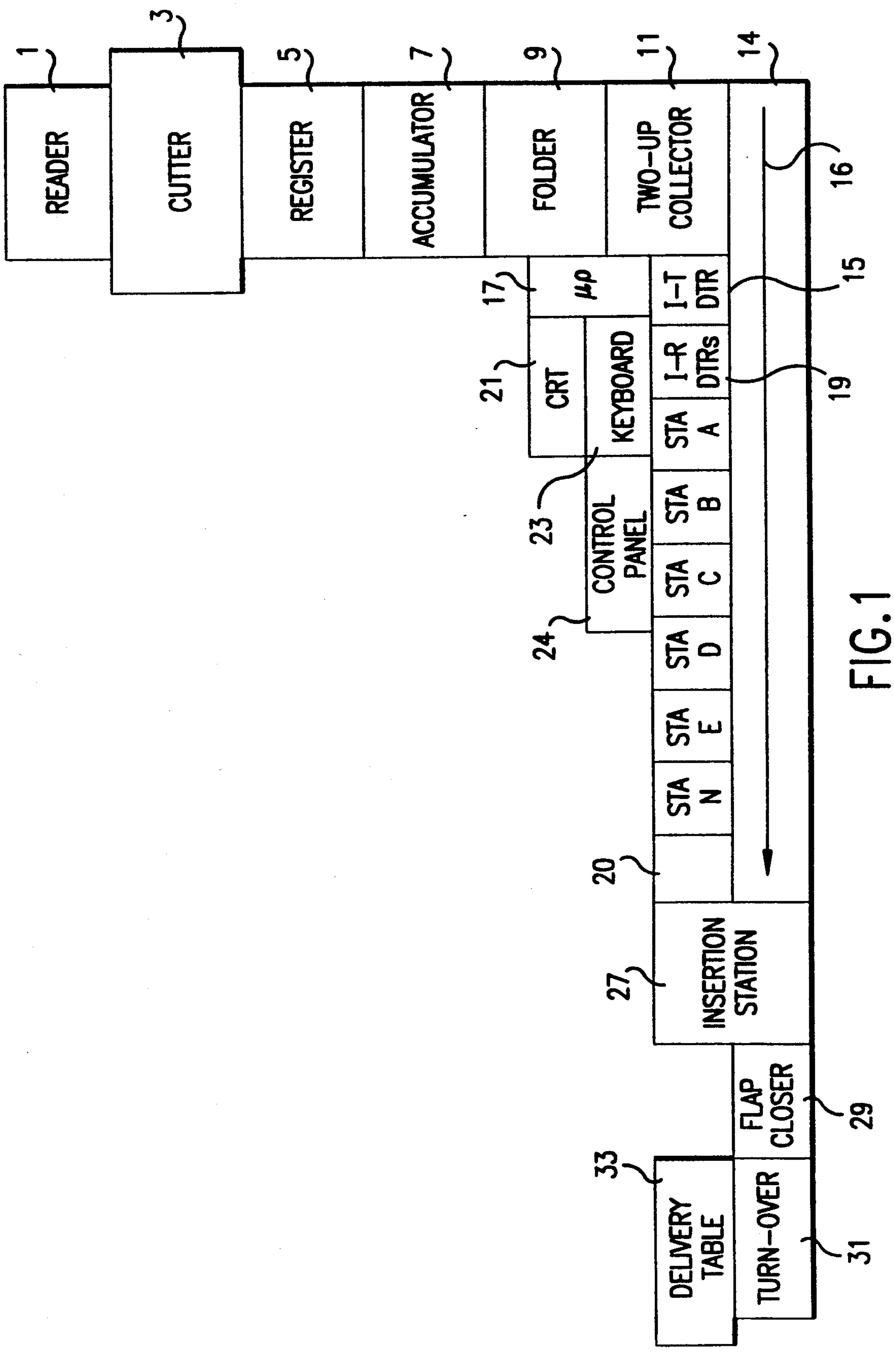
FIG. 1 is a block diagram showing the elements of the present invention.

FIG. 1 shows a document-insertion machine for accumulating a series of groups of documents from a web of sheet material on which individual sheets are preprinted in a two-up fashion. The web of sheet material further includes indicia pre-printed in at least one disposable margin of a control document for each group of documents. A reader 1 accepts sheet material (not shown) and reads for each group the pre-printed indicia. The pre-printed indicia contains coded instructions for processing the group associated with the control document on which the indicia is printed. Such instructions include, for example, the number of and order of sheets in that particular group. The reader may comprise an optical mark reader, a bar-code reader, or other conventional indicia-reading means. Instructions read by the reader are passed to a central microprocessor 17, where they are used to control processing equipment downstream from the reader. The microprocessor 17 may comprise a Texas Instruments model 9995, or other suitable microprocessor. A control panel 24 is provided for allowing operator-control of basic functions, such as start, stop, run, jog, and reset.

The web of sheet material then passes through a cutter 3 which cuts the continuous web into a series of individual sheets. The sheets are then fed to an accumulator 7, which accumulates a stream of sheets in a pile until the last sheet to be associated with the pile is delivered thereto, at which time the completed pile is ejected and accumulation of the next pile begins. The number and order of sheets in an individual pile are controlled by the accumulator according to instructions read by the reader from the control document.

The piles of documents ejected from the accumulator are accepted by a folder 9, which folds a pile into letter size and deposits it with the collector 11. The collector 11, once it has received a proper number of folded piles according to the instructions read from the control document, delivers the completed group of documents onto a track 14.

The track 14 comprises a conventional raceway conveying means for delivery of the piles in the direction of arrow 16. A group of documents first passes an in-track detector 15 which senses the presence of a document in the track and sends a document-in-track signal to a microprocessor 17 as a control signal for control of processing means along the track. The in-track detector 15 may comprise a photocell or other conventional sensing means. A CRT 21 and keyboard 23 are provided adjacent the track 14 for allowing a machine operator to interface with the machine.

The group then passes a series of detectors 19. In a preferred embodiment, the detectors are of the infrared-type. Each detector senses whether the group contains more than a certain preset number of documents. The detectors are each preset to successive trip-levels, and each detector is tripped if the number of documents in a passing group is higher than that detector's preset trip level. The microprocessor 17 receives signals from the detectors 19 and from the reader 1, and compares those signals to determine whether the number of documents as measured by the detectors exceeds the expected number in that group as read by the reader from the group's control document. If the measured number exceeds the expected number, the microprocessor performs a series of steps which allow for correction of the error.

In a preferred embodiment, upon detecting an error condition, the microprocessor 17 executes a "machine fault", thereby halting the machine cycle, and sends an error signal to the CRT, the error signal serving to alert the machine operator of the error and to convey information such as the expected number and the measured number. When the error has been cleared by the machine operator, the operator removes the microprocessor from "machine fault" mode by actuating a switch on the control panel 24, thereby restarting the machine cycle.

In an alternate embodiment, the microprocessor 17 does not halt the machine cycle upon detection of a double document, but rather sends a signal to an error-remediation means 20 downstream from the detectors. The error-remediation means 20 may comprise a divert mechanism for diverting the group-in-error to a divert area for error remediation. The latter embodiment allows for uninterrupted machine operation in spite of detection of a double-document.

In a still further embodiment, the remediation means 20 comprises a printer for printing on a group-in-error a code for identifying the group as such in processing downstream of the printer. The code printed may further include information identifying the expected and/or measured number associated with the group-in-error.

A group travelling along track 14 in the direction of arrow 16 passes a series of insert processing stations labelled "STA A" through "STA N". Each of these stations selectively adds inserts to a group in a known manner according to various criteria, and may comprise "gripper-arm" type inserters or other known inserters. Such stations are described in more detail in U.S. Pat. No. 4,955,185 to Haas.

The group of documents is inserted into an awaiting envelope at insertion station 27, after which the envelope flap is closed at flap closer 29. The closed envelope is turned over at station 31 and deposited onto a delivery table 33 for removal from the machine.

Figure 2:
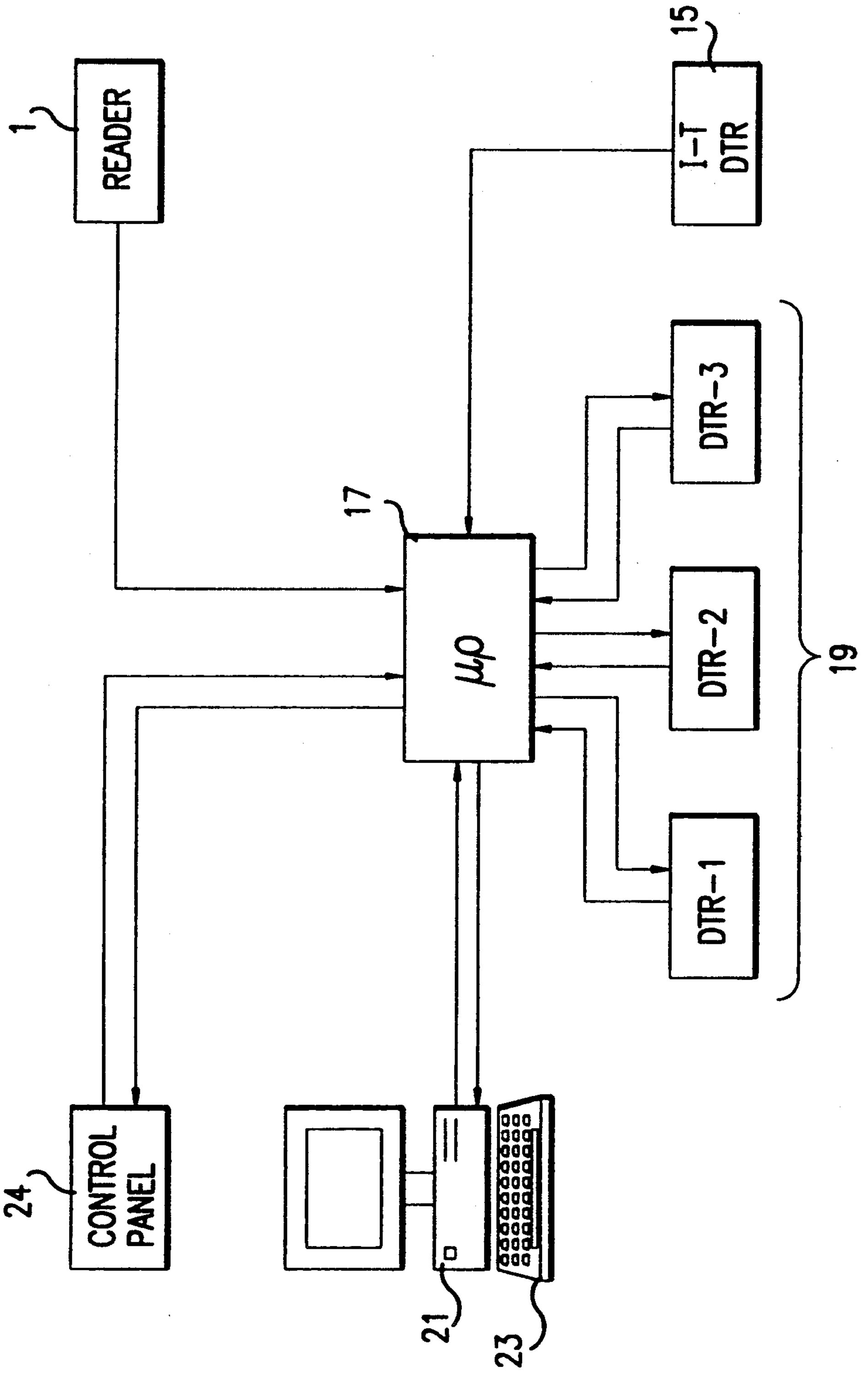
FIG. 2 is a block diagram showing the relationship and general flow of information between electrical components of the present invention.

FIG. 2 shows a block diagram of the relationship and general flow of information between electrical components of the present invention according to a preferred embodiment of the invention. Reader 1 reads information from a control document of a group of documents being processed by the machine. Information regarding the expected count of documents in the group currently being read is passed to the microprocessor 17. In-Track detector 15 detects the presence of a group of documents in the track and delivers a signal indicative thereof to the microprocessor 17. The microprocessor 17 accepts measured-size information from the detectors 19 and compares the measured count to the expected count as read by the reader 1 from the control document of the group currently being measured. If the measured count exceeds the expected count, the microprocessor sends an error signal, which includes the expected count and the measured count, to a CRT 21, which in turn displays a message to alert the machine operator of the double-document condition. At this time, the microprocessor is instructed to enter "machine fault" mode, in which the machine cycle is halted until the error is cleared by the machine operator. Upon entry into "machine fault" mode, the microprocessor sends a signal causing a reset button to light up on control panel 24. The machine operator then remedies the double document condition by, for example, removing the faulty group from the track. The machine operator then enters a "clear" command by pressing the reset button on control panel 24, causing an "error-cleared" signal to be sent to microprocessor 17. This removes the microprocessor from "machine fault" mode, the machine cycle is re-started, the next group is measured by the detectors 19, and so on.

Figure 3:
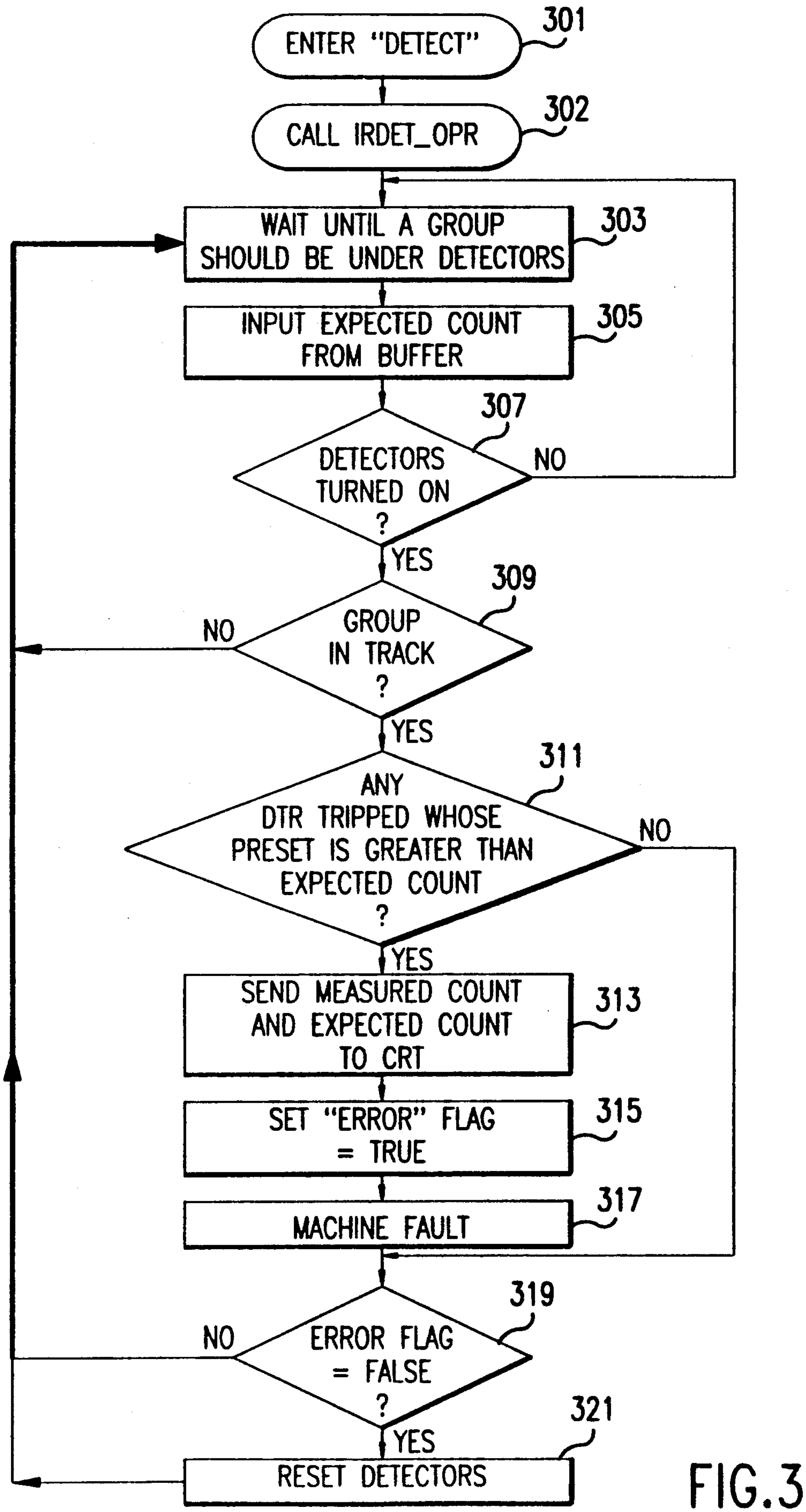
FIG. 3 is a flowchart showing the logical steps of the routine "DETECT" for controlling the microprocessor of the machine according to the present invention.

FIG. 3 is a flowchart of the "DETECT" routine, which is executed by microprocessor 17. The "DETECT" routine instructs the microprocessor to read measured-size information from the detectors 19 and to send error-signals to the CRT if the measured count for a group exceeds the expected count for that group.

Figure 4:
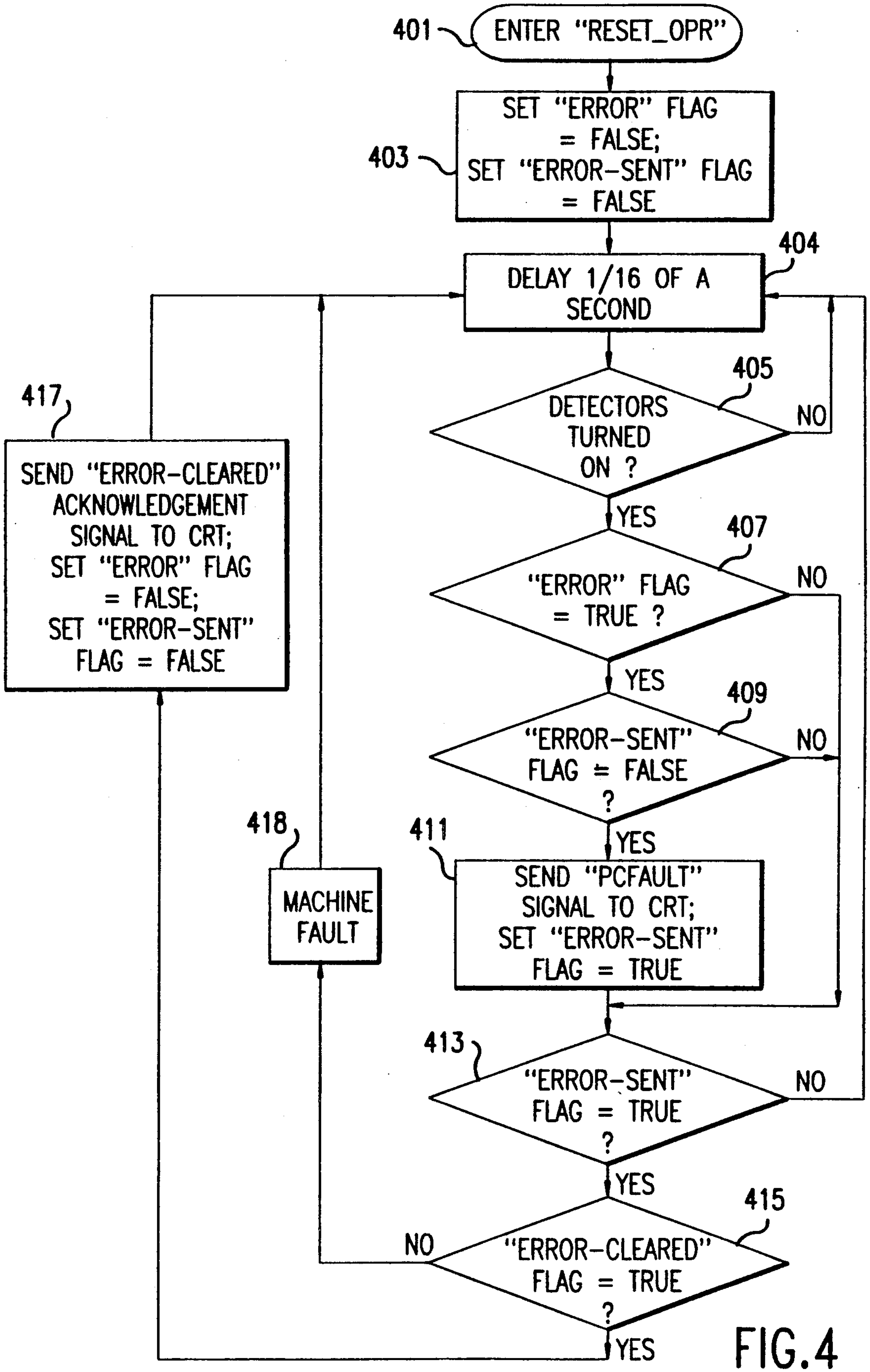
FIG. 4 is a flowchart of the routine "IRDET_OPR" for monitoring the functioning of the "DETECT" routine.

The "DETECT" routine is entered at step 301 upon power-up of the machine. At step 302, the microprocessor is instructed to call the "IRDET_OPR" routine, which is shown at FIG. 4. At step 303, execution of subsequent steps is delayed until the next group should be in the track 14. This timing is dependent upon the operation of a machine-cycle detector. Each machine cycle represents completion of one stage in the processing of a group of documents currently in the track 14. With a few exceptions, a group of inserts is inserted into an awaiting, corresponding envelope at the end of each machine cycle, and other groups upstream of the inserted group move at that time to the next stage in the processing operation.

In a preferred embodiment, the machine-cycle detector takes the form of a mechanical, rotating disk which rotates 360 degrees with each machine cycle. A position sensor senses the position, in degrees, of the disk and sends a signal indicative of that position to the microprocessor 17. Such a machine cycle detector is taught with more specificity in U.S. Pat. No. 4,172,525, the entire disclosure of which is incorporated herein by reference. In the present embodiment, step 303 delays execution of subsequent steps until a point in time at which a position of 50 degrees in the current machine cycle has been detected by the machine-cycle detector and sent to the microprocessor 17. However, the optimum timing for execution of subsequent steps will vary according to the specific setup of the insertion machine to which the invention is applied.

At the next step 305 the microprocessor 17 assigns to a variable "CNT" the expected count corresponding to a group of documents whose current position is proximal to the double-document detectors 19. The expected count is read from a buffer associated with reader 1, the operation of which is discussed above.

At decision step 307 the microprocessor 17 determines whether the double-document detectors 19 are turned on, and execution of the routine proceeds only if such a condition is detected. The decision at step 307 is based on the presence or non-presence of an "online" signal from the detectors to the microprocessor.

At decision step 309 the microprocessor 17 determines whether a group of documents is actually in the track in a position at which the group can be measured by the double document detectors 19, and execution of the routine proceeds only if such a condition is detected. The decision at step 309 is based on the presence or non-presence of a "group-in-track" signal from the in-track detector 15 to the microprocessor 17. Upon a "false" answer at either of decision steps 307 or 309, the routine returns to step 303.

At decision step 311 the microprocessor determines whether any detector whose preset is greater than the variable "CNT" has been tripped. As discussed above, each of the detectors 19 are preset to be tripped if a group of documents whose size exceeds a certain number passes that detector. The detectors are preset to successive trip levels; if any detector's preset level exceeds the current value of the "CNT" variable and that detector has been tripped by passage of the current group, it is determined that a double-document condition exists for that group and the routine proceeds to step 313. If no such trip condition exists, it is determined that no double document condition exists for the current group and the routine jumps to step 319.

At step 313 values for the measured count and the expected count are sent from the microprocessor 17 to the CRT 21 by assigning those values to integer variables "PCINT1" and "PCINT2", respectively. Those variables are used by the CRT for error remediation processing, such as generation of an error message which displays the expected count and the measured count for the current group being measured. The measured-count variable "PCINT1" is made equal to the lowest preset value of any tripped detector; and, the expected count variable "PCINT2" is made equal to the current value of the "CNT" variable.

At step 315 an "error" flag is set to "true". The true/false state of this flag is examined by the IRDET_OPR routine, discussed below, for use in error-condition monitoring. The flag is reset to "false" by that routine when the error has been cleared.

At step 317 the microprocessor is instructed to enter "machine fault" mode. When this mode has been actuated, the machine-cycle is halted so that the group currently being measured does not advance beyond the double document detectors until the error condition has been cleared. Thus, a group which contains a double-document error will remain at the double-document detectors until the error is cleared.

At decision step 319 the microprocessor determines whether the "error" flag is set to a "false" state. If the "error" flag equals "false", this is an indication that no double-document condition exists; accordingly, the machine cycle is running at that time and the microprocessor proceeds to step 321 and continues with measurement of the next group. If the "error" flag equals "true", this is an indication that a double-document condition still exists and has not been cleared; accordingly, the machine cycle is currently halted at that time and the microprocessor is instructed to return to step 303 without proceeding to step 321.

At step 321, the detectors 19 are reset so that each detector is in a non-tripped state, so as to allow measurement of the next group passing the detectors. Upon completion of step 321, the microprocessor is instructed to return to step 303 to continue with measurement of the next group.

FIG. 4 is a flowchart of the "IRDET_OPR" routine, which is executed by microprocessor 17. The "IRDET_OPR" routine monitors the execution of the "DETECT" routine and allows an operator to clear an error situation when the error has been remedied. The routine starts at step 401 upon being called at step 302 of the "DETECT" routine, discussed above. At step 403 the "error" and "error-sent" flags are set to the default "false" condition. At step 404, the microprocessor is instructed to delay execution of the routine for 1/16 of a second in order to allow processor time for execution of other, simultaneously-running, routines, such as the "DETECT" routine discussed above. At decision step 405 the microprocessor 17 determines whether the double-document detectors 19 are turned on, and execution of the routine proceeds only if such a condition is detected At decision step 407 the microprocessor determines whether the "error" flag is set to "true". Such a condition would exist if a double-document situation had been detected by the "detect" routine and the error had not yet been cleared. If the "error" flag is set to "false", the microprocessor is instructed to jump to step 413, discussed below. If, however, the "error" flag is set to "true", the microprocessor 17 is instructed to proceed to decision step 409, at which step it is determined by the microprocessor 17 whether the "error-sent" flag is set to "false". Such a condition would exist if a double-document situation had been detected by the "detect" routine but the error signals at step 313 of the "detect" routine had not been sent to the CRT 21. If the "error-signal-sent" flag is not set to "false", the microprocessor is instructed to jump to step 413, discussed below. Otherwise, the microprocessor 17 is instructed to proceed to step 411, at which step a "PCFAULT" signal is sent to the CRT to alert the operator of a fault in the operation of the routine.

At decision step 413 it is determined whether the "error-sent" flag now is set to "true". If not, the microprocessor 17 is instructed to return to step 404. If the "error-signal-sent" flag is now set to "true", the routine proceeds to decision step 415, at which step it is decided whether the "error-cleared" flag is set to "true". Such a condition would exist if an error-condition had been detected by the "detect" routine and that condition had already been remedied by the operator and cleared by him via a switch (not shown) on a control panel of the machine. If the error has not been cleared, the routine returns to step 404 via step 419, the latter step serving to retain the machine cycle in a halted state until a switch (not shown) on a control panel of the machine is actuated. Otherwise, the routine returns to step 404 via step 417, the latter step serving to acknowledge clearance of the error to the operator at the CRT and to reset the "error" and "error-sent" flags to their default state (false).

While the invention has been particularly shown and described with reference to preferred embodiments thereof, it will be understood by those skilled in the art that various changes in form and details may be made therein without departing from the spirit and scope of the invention. For example, other types of machine cycle detectors can be employed in place of the rotating-disk-type machine cycle detector described above.

We claim:

1. A thickness-measuring system for detecting the thickness of a plurality of documents, comprising:

a plurality of document-thickness detectors, each detector being present to a successive maximum allowable document-group-thickness threshold, whereby a group of documents whose measured thickness exceeds a preset maximum allowable size for a particular detector will cause a line associated with said particular detector to change from a normal level to a tripped level upon passing of said group of documents into proximity of said particular detector; and, a processor means for determining a measured thickness of said group of documents according to which of said successively preset detectors was the first to be tripped, and for producing a measured thickness signal indicative of said determination.

2. The thickness-measuring system according to claim 1, wherein said processor means further comprises:

means for receiving a signal indicative of an expected thickness of said group of documents;

means for comparing said signal indicative of an expected thickness with said measured thickness signal; and means for generating an error signal if said measured thickness differs from said expected thickness.

3. The thickness-measuring system according to claim 2, further comprising:

a machine-control means for receiving said error signal and for executing at least one error-correction step in response to said error signal.

4. The thickness-measuring system according to claim 3, wherein said means for executing at least one error-correction step comprises means for halting advancement of at least one group of documents from a first processing station to a next successive processing station.

5. The thickness-measuring system according to claim 4, wherein said means for executing at least one error-correction step further comprises means for altering a machine operator that an error condition has been detected.

6. The thickness-measuring system according to claim 5, wherein said means for altering a machine operator comprises means for sending an error message to a display device, said error message containing information which aids a machine operator in clearing said error condition.

7. The thickness-measuring system according to claim 6, wherein said information comprises an indication of an expected number of documents in said group of documents and an indication of a measured number of documents in said group of documents.

8. The thickness-measuring system according to claim 3, wherein said means for executing at least one error-correction step comprises means for diverting at least one group of documents from a predetermined processing course.

9. The thickness-measuring system according to claim 1, wherein said measured thickness signal comprises a signal indicative of the number of documents in said group of documents.

10. The thickness-measuring system according to claim 2, wherein said signal indicative of an expected thickness of said group of documents comprises a signal indicative of an expected number of documents in said group of documents.

11. The thickness-measuring system according to claim 1, wherein said thickness detectors comprise infrared sensors.

12. A document processing machine capable of detecting a double-document situation in a group of documents of a series of groups of documents being processed, comprising:

a plurality of document thickness detectors, each detector being preset to a successive maximum allowable document-group-thickness threshold, whereby a group of documents whose measured thickness exceeds a preset maximum allowable size for a particular detector will cause a line associated with said particular detector to change from a normal level to a tripped level upon passing of said group of documents into proximity of said particular detector;

a processor means for determining the number of documents in said group of documents according to which of said successively preset detectors was the first to be tripped, and for producing a measured number signal indicative of said determination, said processor means further comprising:

means for receiving a signal indicative of an expected number of documents in said group of documents;

means for comparing said signal indicative of said expected number with said measured number signal; and means for generating an error signal if said measured number is greater than said expected number;

a machine-control means, further comprising:

means for halting advancement of said group of documents from a detector area upon receipt of said error signal;

means for displaying an expected count and a measured count of documents in said group of documents; and means for reinitiating advancement of said group of documents upon receipt of an error-cleared signal.

13. A method of detecting the thickness of a plurality of documents, comprising:

presetting a series of thickness detectors to successive maximum allowable document-group-thickness thresholds, whereby a group of documents whose measured thickness exceeds a preset line associated with said particular detector to change from a normal level to a tripped level upon passing of said group of documents into proximity of said particular detector;

determining a measured thickness of said group of documents according to which of said successively preset detectors was the first to be tripped; and, generating a measured thickness signal indicative of said determination.

14. The method according to claim 13, further comprising the steps of:

generating a signal indicative of an expected thickness of said group of documents;

comparing said signal indicative of an expected thickness with said measured thickness signal; and generating an error signal if said measured thickness differs from said expected thickness.

15. The method according to claim 14, further comprising the step of:

executing at least one error-correction step in response to said error signal.

* * * * *